US012804258B2

(12) United States Patent
Hongu et al.

(10) Patent No.: US 12,804,258 B2
(45) Date of Patent: Nov. 17, 2026

(54) FOCUS CONTROL DEVICE CAPABLE OF PREVENTING OBJECT FROM BEING EXCLUDED FROM FOCUSING TARGET, FOCUS CONTROLLING METHOD, AND STORAGE MEDIUM

(71) Applicant: CANON KABUSHIKI KAISHA, Tokyo (JP)

(72) Inventors: Hideyasu Hongu, Kanagawa (JP); Taira Komatsuzaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 19/189,737

(22) Filed: Apr. 25, 2025

(65) Prior Publication Data

US 2025/0254422 A1 Aug. 7, 2025

Related U.S. Application Data

(63) Continuation of application No. 18/753,461, filed on Jun. 25, 2024, now Pat. No. 12,316,962, which is a
(Continued)

(30) Foreign Application Priority Data

Mar. 31, 2021 (JP) ................................ 2021-060781

(51) Int. Cl.
*H04N 23/667* (2023.01)
*G03B 13/18* (2021.01)
(Continued)

(52) U.S. Cl.
CPC ........... *H04N 23/667* (2023.01); *G03B 13/18* (2013.01); *G03B 13/36* (2013.01); *H04N 23/675* (2023.01)

(58) Field of Classification Search
CPC .. H04N 23/667; H04N 23/675; H04N 23/633; H04N 23/672; G03B 13/18; G03B 13/36
See application file for complete search history.

(56) References Cited

U.S. PATENT DOCUMENTS 6,853,502 B2 * 2/2005 Sasaki .................... G02B 7/102 396/137
2008/0278618 A1 * 11/2008 Matsumoto .......... H04N 23/672 348/E5.042
(Continued)

FOREIGN PATENT DOCUMENTS

JP 2010-097167 A 4/2010
JP 2016-206352 A 12/2016

*Primary Examiner* — Shahbaz Nazrul
(74) *Attorney, Agent, or Firm* — Cowan, Liebowitz & Latman, P.C.

(57) ABSTRACT

A focus control device that is capable of preventing an object intended by a user from being excluded from a focusing target. The focus control device performs focus adjustment by using one of autofocus and manual focus. When focus control is switched from the autofocus to the manual focus, and then switched to the autofocus, whether to perform focus adjustment with settings of the autofocus set before being switched to the manual focus, or with settings of the autofocus to be set after being switched from the manual focus, is controlled according to whether or not there is an object focused by the manual focus.

14 Claims, 10 Drawing Sheets

Related U.S. Application Data continuation of application No. 18/451,202, filed on Aug. 17, 2023, now Pat. No. 12,047,679, which is a continuation of application No. 17/703,045, filed on Mar. 24, 2022, now Pat. No. 11,765,455.

(51) Int. Cl.
*G03B 13/36* (2021.01)
*H04N 23/67* (2023.01)

(56) References Cited

U.S. PATENT DOCUMENTS

| | | | | |
|---|---|---|---|---|
| 2012/0051727 | A1* | 3/2012 | Tanaka | G03B 17/14<br>396/49 |
| 2016/0295120 | A1* | 10/2016 | Ota | H04N 23/667 |
| 2016/0309089 | A1* | 10/2016 | Hongu | H04N 23/61 |
| 2018/0242829 | A1* | 8/2018 | Yoshino | G02B 7/09 |
| 2020/0344406 | A1* | 10/2020 | Takeuchi | H04N 23/60 |

* cited by examiner

FOCUS CONTROL DEVICE CAPABLE OF PREVENTING OBJECT FROM BEING EXCLUDED FROM FOCUSING TARGET, FOCUS CONTROLLING METHOD, AND STORAGE MEDIUM

CROSS-REFERENCE TO RELATED APPLICATION

This application is a continuation of application Ser. No. 18/753,461, filed Jun. 25, 2024, which is a continuation of application Ser. No. 18/451,202, filed Aug. 17, 2023, which is a continuation of application Ser. No. 17/703,045, filed Mar. 24, 2022, which issued as U.S. Pat. No. 11,765,455 on Sep. 19, 2023, the entire disclosures of which are hereby incorporated by reference.

BACKGROUND OF THE INVENTION

Field of the Invention

The present invention relates to a focus control device that is capable of preventing an object from being excluded from a focusing target, a focus controlling method, and a storage medium.

Description of the Related Art

A digital camera has an autofocus (hereinafter referred to as AF) function of performing focus control so as to automatically focus on a predetermined area on a screen. A variety of methods are used for selecting an area as the AF target. As a related art, there have been proposed techniques in Japanese Laid-Open Patent Publication (Kokai) No. 2016-206352 and Japanese Laid-Open Patent Publication (Kokai) No. 2010-97167. In the technique disclosed in Japanese Laid-Open Patent Publication (Kokai) No. 2016-206352, when the focus control is switched from AF (autofocus) to MF (manual focus), a plurality of small areas are set in an area set by AF. Then, when the focus control is switched from MF to AF, an AF area determined to be in an in-focus state out of the plurality of areas set by MF is set. In the technique disclosed in Japanese Laid-Open Patent Publication (Kokai) No. 2010-97167, the focus control is performed by a manual operation, and in a case where the best focus on an object is obtained, the in-focus range is divided into a plurality of areas, and the position of an AF frame is automatically set from the divided areas.

In the technique disclosed in Japanese Laid-Open Patent Publication (Kokai) No. 2016-206352, the area based on the MF operation is set in the AF area set for the object. In a case where an object as the focusing target is outside the AF area set before the MF operation, the AF control cannot be performed for the object as the focusing target, and hence it is impossible to focus on the object intended by the user. In the technique disclosed in Japanese Laid-Open Patent Publication (Kokai) No. 2010-97167, the AF position is set after the MF operation has been performed. Therefore, in a variety of scenes, a user is required to perform the MF operation for focusing on an object aimed by the user whenever photographing is performed and required to have a high level of skill. As a result, the user sometimes fails in focusing on the intended object. This problem can occur in an apparatus that controls desired focusing, other than an image capturing apparatus, such as a digital camera.

SUMMARY OF THE INVENTION

The present invention provides a focus control device that is capable of preventing an object intended by a user from being excluded from a focusing target, a focus controlling method, and a storage medium.

In a first aspect of the present invention, there is provided a focus control device including a processor, and a memory storing a program which, when executed by the processor, causes the focus control device to: perform focus adjustment by using one of autofocus and manual focus; and control, when focus control is switched from the autofocus to the manual focus, and then switched to the autofocus, whether to perform focus adjustment with settings of the autofocus set before being switched to the manual focus or with settings of the autofocus to be set after being switched from the manual focus, according to whether or not there is an object focused by the manual focus.

In a second aspect of the present invention, there is provided a focus control device including a processor, and a memory storing a program which, when executed by the processor, causes the focus control device to: perform focus adjustment by using one of autofocus and manual focus, and perform, when the focus control is switched from the autofocus to the manual focus, and then switched from the manual focus to the autofocus, control for expanding a ranging target area to be set by settings of the autofocus after being switched from the manual focus from a ranging target area set by settings of the autofocus before being switched to the manual focus.

In a third aspect of the present invention, there is provided a focus controlling method that makes it possible to perform focus adjustment by using one of autofocus and manual focus, including controlling, when focus control is switched from the autofocus to the manual focus, and then switched to the autofocus, whether to perform focus adjustment with settings of the autofocus set before being switched to the manual focus, or with settings of the autofocus to be set after being switched from the manual focus, according to whether or not there is an object focused by the manual focus.

In a fourth aspect of the present invention, there is provided a focus controlling method that makes it possible to perform focus adjustment by using one of autofocus and manual focus, including performing, when the focus control is switched from the autofocus to the manual focus, and then switched from the manual focus to the autofocus, control for expanding a ranging target area to be set by settings of the autofocus after being switched from the manual focus from a ranging target area set by settings of the autofocus before being switched to the manual focus.

According to the present invention, it is possible to prevent an object intended by a user from being excluded from a focusing target.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. However, the configuration described in the following embodiment is given only by way of example, and is by no means intended to limit the scope of the present invention.

Figure 1:
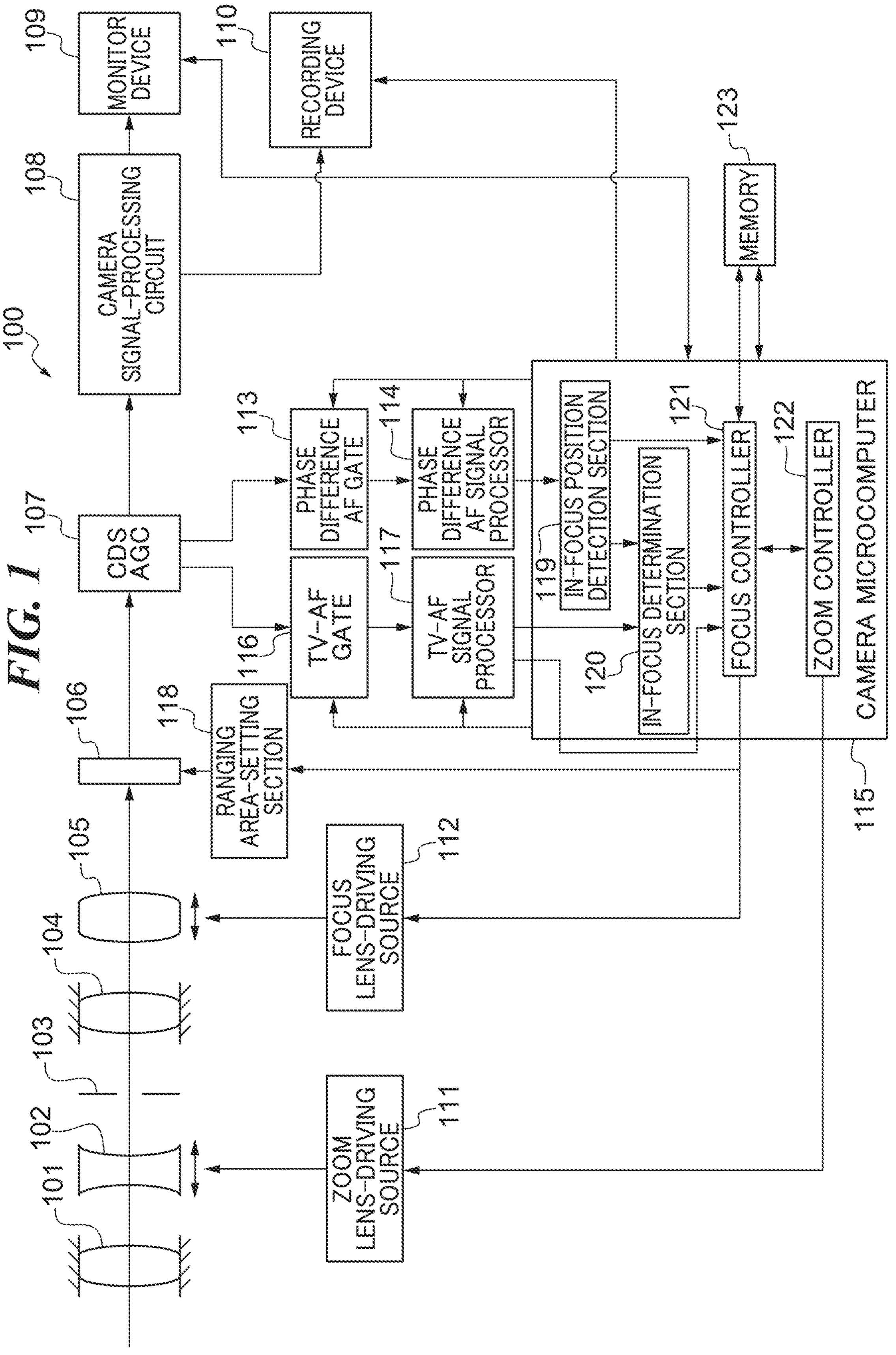
FIG. 1 is a diagram showing an example of the configuration of an image capturing apparatus.

FIG. 1 is a diagram showing an example of the configuration of an image capturing apparatus 100 according to the present embodiment. The image capturing apparatus 100 is, for example, a digital camera or a video camera. The image capturing apparatus 100 corresponds to a focus control device that performs focus control. The focus control device may be an electronic device, such as a smartphone and a tablet terminal. Further, in a case where the image capturing apparatus 100 has a communication function, an external server (information processing apparats) may function as the focus control device, and the image capturing apparatus 100 may perform wireless communication with the external server, whereby control of the present embodiment may be realized.

The image capturing apparatus 100 includes an image capturing optical system for imaging light from an object. In the illustrated example in FIG. 1, the image capturing optical system is formed by a first group lens 101, a zoom lens 102, a diaphragm 103, a second group lens 104, and a focus lens 105 (focus compensator lens). The first group lens 101 and the second group lens 104 are fixed lenses. The zoom lens 102 performs a zooming operation by moving in an optical axis direction. The focus lens 105 has a function of correcting movement of a focusing surface, caused by the zooming operation, and a focus adjustment function. The diaphragm 103 has a predetermined diaphragm function. The image capturing optical system further includes a focus ring, not shown, and the focus lens 105 moves in the optical axis direction according to an amount of manual operation of the focus ring.

An image sensor 106 is a photoelectric conversion element, such as a CCD sensor or CM OS sensor. Light incident through the image capturing optical system forms an image on the image sensor 106. The image sensor 106 photoelectrically converts the light forming the image and outputs electrical signals. A CDS/AGC circuit 107 samples the electrical signals output from the image sensor 106 and adjusts a gain. A camera signal-processing circuit 108 performs image processing on signals output from the CDS/AGC circuit 107 to generate image capturing signals (image). A monitor device 109 is a display, such as an LCD, and displays an image output from the camera signal-processing circuit 108. Further, the monitor device 109 displays not only the image, but also information on a photographing mode of the image capturing apparatus 100 and information on an AF ranging frame serving as a guide of a set focus detection area, and so forth. A recording device 110 records the image output from the camera signal-processing circuit 108 in a recording medium, such as a magnetic tape, an optical disk, and a semiconductor memory.

A zoom lens-driving source 111 is a driving source for moving the zoom lens 102 in the optical axis direction to perform a zooming operation. A focus lens-driving source 112 is a driving source for moving the focus lens 105 in the optical axis direction to perform focus adjustment. The zoom lens-driving source 111 and the focus lens-driving source 112 are each implemented by an actuator, such as a stepping motor, a DC motor, a vibration motor, or a voice coil motor.

A phase difference AF gate 113 is a gate for passing first focus detection signals and second focus detection signals detected by the phase difference AF method from pixels associated with respective focus detection areas in the AF frame, out of pixels set by a ranging area-setting section 118. A phase difference AF signal processor 114 performs correlation calculation based on each associated two focus detection signals passing through the phase difference AF gate 113 and calculates an image displacement amount for each focus detection area. The calculated image displacement amounts are output to a focus position detection section 119 of a camera microcomputer 115. The camera microcomputer 115 includes the focus position detection section 119, a focus determination section 120, a focus controller 121, and a zoom controller 122.

By using the focus detection method based on the phase difference AF method, the focus position detection section 119 calculates an amount of displacement (defocus amount) between a current focus position and an in-focus position on the imaging surface of the image sensor 106 based on the image displacement amounts calculated by the phase difference AF signal processor 114. The focus position detection section 119 sends the calculated defocus amount to the focus controller 121. Further, the focus position detection section 119 converts the calculated defocus amount to a driving amount of the focus lens 105 and sends the driving amount to the focus determination section 120. The focus determination section 120 sends information on the driving amount of the focus lens 105 to the focus controller 121. The focus controller 121 controls the focus lens-driving source 112 to drive the focus lens 105 based on the received information on the driving amount and thereby executes the AF control for automatically performing focus adjustment.

A TV-AF gate 116 and a TV-AF signal processor 117 are provided to realize a TV-AF method employed as the AF method other than the phase difference AF method. The TV-AF gate 116 supplies only signals of an area used for focus detection by the TV-AF, out of signals of all pixels output from the CDS/AGC circuit 107, to the TV-AF signal processor 117. The TV-AF signal processor 117 applies e.g. a method of extracting specific frequency components using a filter to the image signals within the TV-AF focus area (within the AF frame in the present embodiment) which are supplied from the TV-AF gate 116. Then, the TV-AF signal processor 117 generates a TV-AF evaluation value at which the sharpness of an image (degree of contrast) becomes the highest in the focus position. The generated TV-AF evaluation value is sent to the focus determination section 120. Further, the generated TV-AF evaluation value is sent to the focus controller 121. The focus controller 121 controls the focus lens-driving source 112 based on the received TV-AF evaluation value to drive the focus lens 105, thereby performing the AF control by the TV-AF method.

The ranging area-setting section 118 sets a pixel group out of all pixels of the image sensor 106, from which the first focus detection signals and the second focus detection signals to be input to the phase difference AF gate 113 are read out. The ranging area-setting section 118 can specify an area of pixels from which signals are read as signals for the phase difference AF, as desired. A memory 123 stores programs executed by the focus controller 121 of the camera microcomputer 115 and desired information. The camera microcomputer 115 including the focus controller 121 forms a CPU. The CPU of the camera microcomputer 115 executes the programs stored in the memory 123, whereby the control according to the present embodiment is achieved. The camera microcomputer 115 may be realized by a predetermined programming circuit. The camera microcomputer 115 or the focus controller 121 corresponds to the focus control device.

In the present embodiment, it is possible to switch between the two focus control modes of an AF (autofocus) mode in which focus adjustment is automatically performed and an MF (manual focus) mode in which focus adjustment is manually performed by a user. The focus controller 121 of the camera microcomputer 115 can alternately switch between the AF mode and the MF mode, based on a user's operation.

Next, a method of setting the ranging area, which is performed by the ranging area-setting section 118, will be described. In the present embodiment, the focus controller 121 sets one of the following two ranging target AF areas based on a user's operation:

first ranging target AF area (standard)

second ranging target AF area (wide)

In a case where the first ranging target AF area (standard) is set, the image capturing apparatus 100 performs AF with respect to an object in the vicinity of the center of the screen. In a case where the second ranging target AF area (wide) is set, the image capturing apparatus 100 also performs AF with respect to an object in a wide area including a range outside the first ranging target AF area (standard). Basically, there is a high probability that a main object as the photographing target exists in the vicinity of the center of the screen. For this reason, the first ranging target AF area (standard) is an area set to exclude an object in a peripheral area of the screen (area other than the center and its vicinity of the screen). On the other hand, there is a case where the main object exists outside the first ranging target AF area (standard). The second ranging target AF area (wide) is an area for performing AF also with respect to an object positioned outside the first ranging target AF area (standard). That is, the second ranging target AF area (wide) is an area obtained by expanding the first ranging target AF area (standard).

Figure 2A:
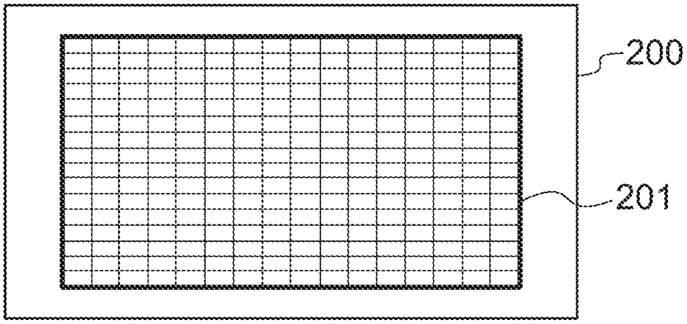
FIGS. 2A to 2D are diagrams showing an example of ranging target AF areas.
Figure 2B:
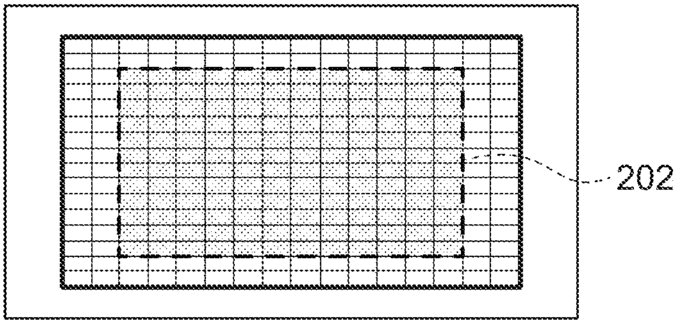
Figure 2C:
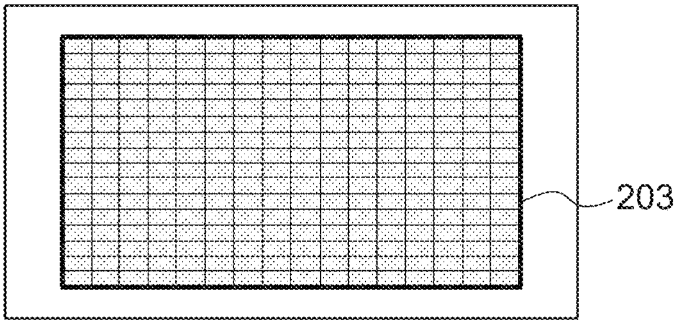
Figure 2D:
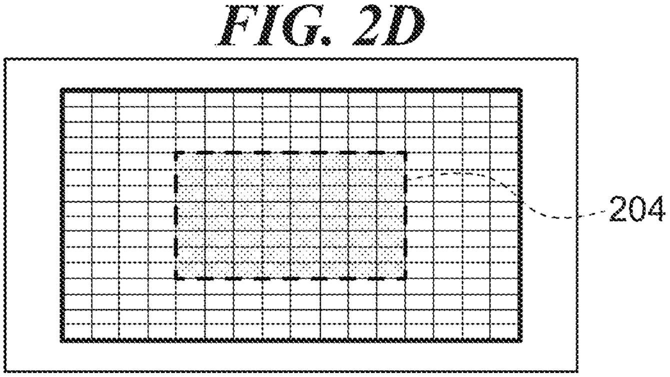

FIGS. 2A to 2D are diagrams showing an example of ranging target AF areas. FIG. 2A is a diagram showing a maximum ranging area 201 set for a captured image 200 formed by image capturing signals acquired from the camera signal-processing circuit 108. The ranging area 201 is divided into a plurality of ranging areas in a grid shape. The following ranging target AF are also each divided into a plurality of ranging areas in a grid shape. FIG. 2B is a diagram showing a first ranging target AF area (standard) 202. FIG. 2C is a diagram showing a second ranging target AF area (wide) 203. The first ranging target AF area (standard) 202 is an area arranged in the vicinity of the center of the screen. The second ranging target AF area (wide) 203 also includes an area outside the first ranging target AF area (standard) 202 as the ranging target AF area. FIG. 2D is a diagram showing a third ranging target AF area (catch) 204. The third ranging target AF area (catch) 204 is a ranging target AF area used when AF is started or used for monitoring for a new object. The third ranging target AF area (catch) 204 is an AF area used as an auxiliary area when the first ranging target AF area (standard) 202 is selected.

The image capturing apparatus 100 can change the ranging target AF area to one of the ranging target AF areas 202 to 204 according to a state of an object and a state of AF from the maximum ranging area 201. This makes it possible to perform control such that an object aimed by a user is maintained to be in focus. When the AF control is performed, the focus controller 121 provides a driving command to the focus lens-driving source 112, using at least one or more ranging results out of a plurality of ranging results obtained from the ranging target AF areas 202 to 204.

Next, the AF control mode will be described. The image capturing apparatus 100 has the following two AF control modes. The image capturing apparatus 100 can select, as desired, the AF control mode set during AF from the following two AF control modes:

first AF control mode (normal)

second AF control mode (limit)

In a case where the first AF control mode (normal) is set, the image capturing apparatus 100 performs the AF control by giving priority to an area in the center and its vicinity of the screen (center priority AF control). In the case where the first AF control mode (normal) is set, the AF control is performed with respect to a close object. In the case where the first AF control mode (normal) is set, the focus controller 121 detects an object existing in the third ranging target AF area (catch) 204 in the center of the screen based on a ranging result, and performs the focusing operation according to the ranging result. In a case where an object which has been once detected moves within the screen, the focus controller 121 continues the AF control with respect to the detected object while the object is moving within the range of the first ranging target AF area (standard) 202. With this, automatic tracking of the object is performed.

In a case where an object is detected based on a ranging result on a nearer side than the current focus lens position in the third ranging target AF area (catch) 204 in the center and its vicinity of the screen, the focus controller 121 detects that a new main object has appeared. In this case, the focus controller 121 performs the focus control according to a ranging result on the new main object detected from the third ranging target AF area (catch) 204.

In a case where the first AF control mode (normal) is set, to sequentially focus on objects appearing in the nearer side in the center, the focus controller 121 performs versatile AF control capable of performing focusing operation in a variety of scenes. The versatile AF control refers to AF control for selecting a focusing area from within a range formed by limiting a ratio of the AF control target area to the screen to some degree. With this, it is possible to prevent the AF control from being erroneously performed on an object positioned in a peripheral portion of the screen (such as a wall and the ground).

In a case where the second AF control mode (limit) is set, the focus controller 121 performs the AF control by giving priority to the in-focus state (in-focus priority AF control). In this case, the focus controller 121 determines, from a ranging result, an object which is in-focus or substantially in-focus when the focus lens 105 is in a current position, and performs the focusing operation according to the ranging result. In the case where the second AF control mode (limit) is set, the focus controller 121 does not change the object as the AF target even when a new object appears in the third ranging target AF area (catch) 204. The second AF control mode (limit) is different from the first AF control mode (normal) in this point.

Therefore, in the second AF control mode (limit), even when a new object appears, instead of changing the object, the focus controller 121 performs the focusing operation only with respect to the object aimed by the user. That is, the second AF control mode (limit) is a highly dedicated mode of AF control in which the focusing operation is performed only with respect to an object intended by a user. Settings of the first AF control mode (normal) and settings of the second AF control mode (limit) are in an exclusive relation. However, in the second AF control mode (limit), in a case where an object in the vicinity of the focusing point disappears, a case where a specific condition is satisfied, and the like cases, the AF control mode is shifted from the second AF control mode (limit) to the first AF control mode (normal).

Next, a relationship between the AF control mode and the ranging target AF area will be described. The image capturing apparatus 100 operates in the first AF control mode (normal) in the normal state. When an operation for changing from AF to MF is performed by a user, the focus controller 121 changes the AF control mode to the MF control mode. Examples of the operation for changing the focus control from AF to MF include a focus ring operation performed by the user. The focus controller 121 maintains the MF control mode in a case where the focus ring operation is continued, and switches the focus control from the MF control mode to the AF control mode when the focus ring operation is terminated. Before the image capturing apparatus 100 shifts from the MF control mode to the AF control mode, the focus controller 121 identifies the position of an object, and determines a AF control mode and a ranging target AF area.

If a user performs the focus ring operation, the mode is changed from the AF control mode to the MF control mode. This means that the user has performed an operation for requesting the image capturing apparatus 100 to change a main object automatically identified in the AF control mode. Then, to identify an object aimed by the user in the MF control, the focus controller 121 performs the following determinations when the MF control mode is changed to the AF control mode:

(1) determination of whether the AF control mode is the first AF control mode (normal) or the second AF control mode (limit), and (2) determination of whether the ranging target AF area is the first ranging target AF area (standard) or the second ranging target AF area (wide).

The above-mentioned determination (1) is determination concerning the optical axis direction (Z axis). In a case where focusing is not to be performed on anything other than the object aimed by the user, the first AF control mode (normal) is changed to the second AF control mode (limit). The above-mentioned determination (2) is determination concerning an X-Y direction (direction of vertical and lateral movement within the screen) orthogonal to the optical axis direction (Z axis). In a case where the object aimed by the user exists in an area other than the center, the first ranging target AF area (standard) is changed to the second ranging target AF area (wide) using the user's operation as a trigger.

Figure 3:
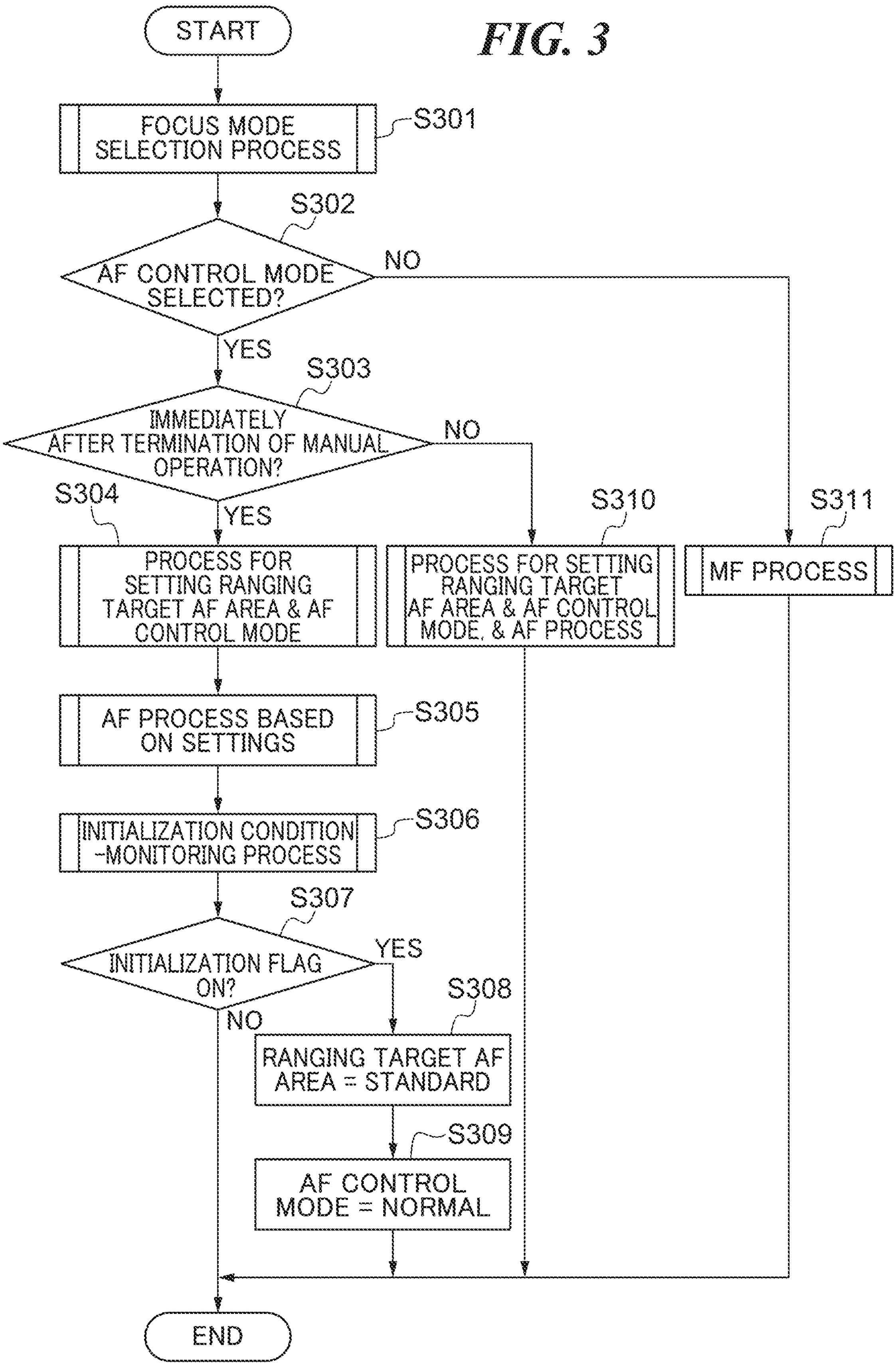
FIG. 3 is a flowchart of the whole process of focus control.

Next, the focus control will be described. The following focus control process is realized by the focus controller 121 of the camera microcomputer 115 that executes a predetermined program. FIG. 3 is a flowchart of the whole process of the focus control. The process in FIG. 3 is repeatedly executed e.g. at a period of readout of image capturing signals (image) from the image sensor 106. In a step S301, the focus controller 121 executes a focus mode selection process. In the focus mode selection process, which of the AF control mode and the MF control mode is to be set is determined. Details of the focus mode selection process will be described hereinafter.

In a step S302, the focus controller 121 determines whether or not the focus mode selected in the step S301 is the AF control mode. If the answer to the question of the step S302 is affirmative (YES) (if the AF control mode has been selected), the process proceeds to a step S303. In the step S303, the focus controller 121 determines whether or not it is immediately after termination of the MF operation. In a case where the image capturing signals (image) were read out immediately before in the MF control mode, and the current mode (mode after one period) is the AF control mode, the focus controller 121 determines that it is immediately after termination of the MF operation.

If the answer to the question of the step S303 is affirmative (YES) (if it is immediately after the MF operation), the process proceeds to a step S304. In the step S304, the focus controller 121 sets the ranging target AF area and the AF control mode according to the case where it is immediately after the MF operation. At this time, the focus controller 121 sets one of the first ranging target AF area (standard) and the second ranging target AF area (wide) as the ranging target AF area. Further, the focus controller 121 sets one of the first AF control mode (normal) and the second AF control mode (limit) as the AF control mode.

In a step S305, the focus controller 121 performs an AF process based on the settings set in the step S304. Details of this process will be described hereinafter. In a step S306, the focus controller 121 performs a process for monitoring a condition for initializing the ranging target AF area and the AF control mode (initialization condition-monitoring process). At this time, the focus controller 121 performs a process for monitoring the condition for initializing the ranging target AF area and the AF control mode set in the step S304 and processing for setting ON/OFF of an initialization flag. Details of this process will be described hereinafter.

In a step S307, the focus controller 121 determines whether or not the initialization flag is ON. If the answer to the question of the step S307 is affirmative (YES) (if the initialization flag is ON), the process proceeds to a step S308. On the other hand, if the answer to the question of the step S307 is negative (NO) (if the initialization flag is OFF), the focus controller 121 terminates the focus control process in FIG. 3. In the step S308, the focus controller 121 returns the ranging target AF area to the first ranging target AF area (standard). In a step S309, the focus controller 121 returns the AF control mode to the first AF control mode (normal). Then, the focus controller 121 terminates the focus control process in FIG. 3.

As the focusing operation of the present embodiment, there is assumed an operation performed in a case where an MF operation is performed after an AF operation has been performed, and then an AF operation is performed again. In an AF setting set by the AF operation performed before the MF operation (first setting), the ranging target AF area and the AF control mode are set to the first ranging target AF area (standard) and the first AF control mode (normal), respectively. An AF setting set by the AF operation performed after the MF operation (second setting) is sometimes different from the first setting. This will be described hereinafter in detail.

If the answer to the question of the step S303 is negative (NO) (if it is not immediately after the MF operation), the process proceeds to a step S310. In the step S310, the focus controller 121 sets the ranging target AF area and the AF control mode according the case where it is not immediately after the MF operation, and performs the AF process according to the settings. At this time, the focus controller 121 sets the first ranging target AF area (standard) and the first AF control mode (normal) as the ranging target AF area and the AF control mode, respectively. Then, the focus controller 121 terminates the focus control process in FIG. 3.

If the answer to the question of the step S302 is negative (NO) (if the MF control mode has been selected), the process proceeds to a step S311. In the step S311, the focus controller 121 performs an MF process. Details of the MF process will be described hereinafter. Then, the focus controller 121 terminates the focus control process in FIG. 3.

Figure 4:
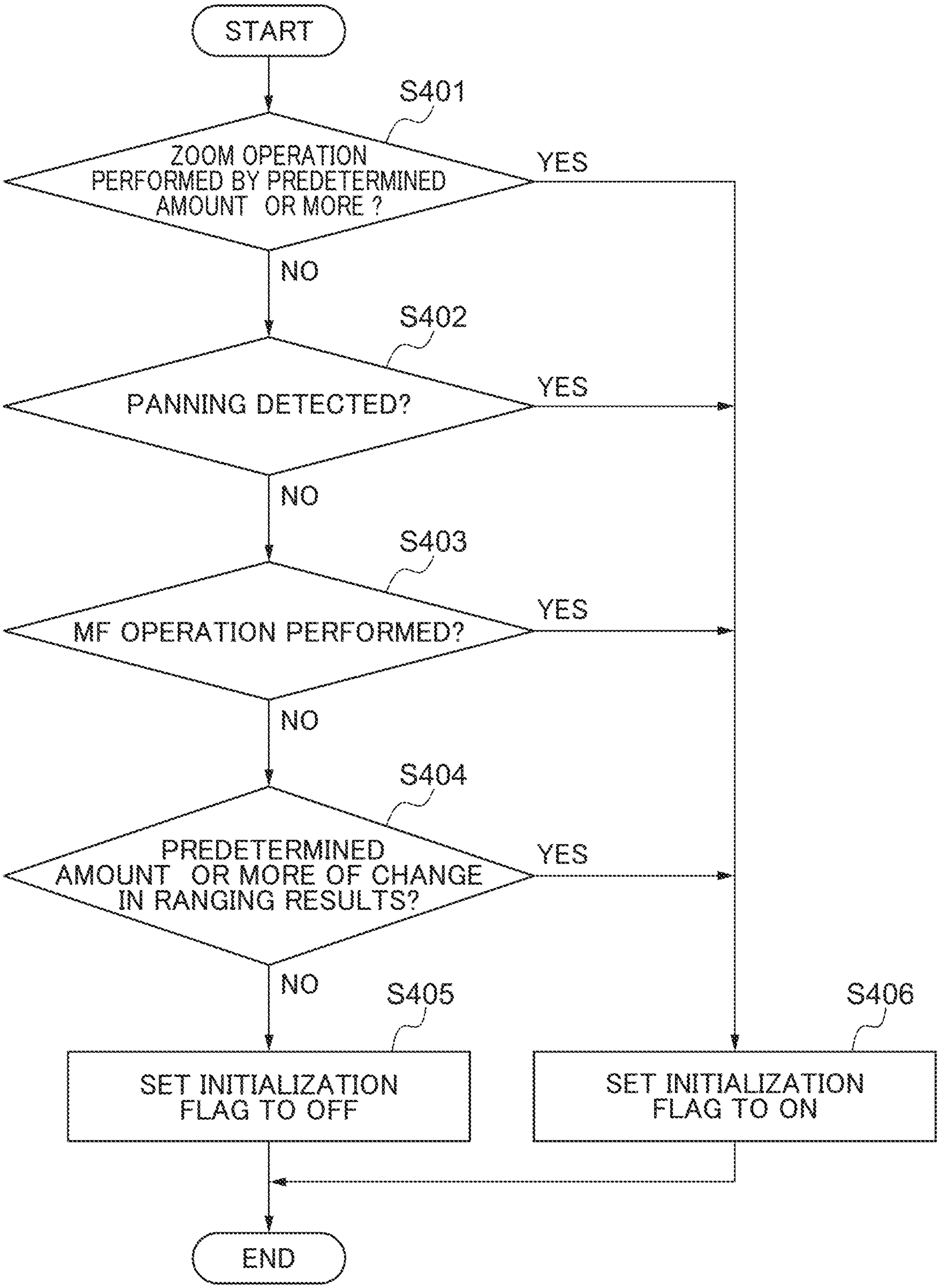
FIG. 4 is a flowchart of an initialization condition-monitoring process.

Next, the initialization condition-monitoring process performed in the step S306 in FIG. 3 will be described. FIG. 4 is a flowchart of the initialization condition-monitoring process. The initialization condition-monitoring process is a process for monitoring whether or not an operation for changing a photographing scene has been performed by a user. In the present embodiment, whether or not the operation for changing a photographing scene has been performed by a user is monitored by monitoring at least one of changes in the focal length, panning operation, the MF operation, and ranging operation. In a case where the operation for changing a photographing scene has been performed, the focus controller 121 sets the initialization flag for returning the settings to respective initial values. The initial values refer to a value of the setting which sets the ranging target AF area to the first ranging target AF area (standard) and a value of setting which sets the AF control mode to the first AF control mode (normal). Hereafter, the initialization condition-monitoring process will be described with reference to the flowchart in FIG. 4.

In a step S401, the focus controller 121 monitors whether or not a predetermined amount or more of a zoom operation has been performed. Note that the predetermined amount can be set as desired. For example, in a case where a zoom operation which changes the focal length by 10% or more is performed, the focus controller 121 determines that the answer to the question of the step S401 is affirmative (YES). If the answer to the question of the step S401 is negative (NO), the process proceeds to a step S402. In the step S402, the focus controller 121 determines whether or not panning has been detected. For example, the determination in the step S402 may be performed based on whether or not an output from an angular velocity sensor, not shown, provided in the image capturing apparatus 100 indicates that panning has been performed to such a degree as will switch over the screen.

If the answer to the question of the step S402 is negative (NO), the process proceeds to a step S403. In the step S403, the focus controller 121 determines whether or not an MF operation has been performed. If the answer to the question of the step S403 is negative (NO) (if an MF operation has not been performed), the process proceeds to a step S404. In the step S404, the focus controller 121 monitors ranging results obtained within the ranging target AF area and determines whether or not there is a predetermined amount or more of change in the ranging results. For example, the focus controller 121 determines whether or not an average of the whole ranging results within the second ranging target AF area (wide) has changed by 20% or more.

If the answer to the question of the step S404 is negative (NO) (if the changed amount in the ranging results is less than the predetermined amount), the process proceeds to a step S405. In the step S405, the focus controller 121 judges that the object has not been changed and sets the initialization flag to OFF. On the other hand, if one of the answers to the questions of the steps S401 to S404 is affirmative (YES), the process proceeds to a step S406. In the step S406, the focus controller 121 judges that the object has been changed and sets the initialization flag to ON. That is, if one of the answers to the questions of the steps S401 to S404 is negative (YES), the AF setting is changed to the first setting.

Figure 5:
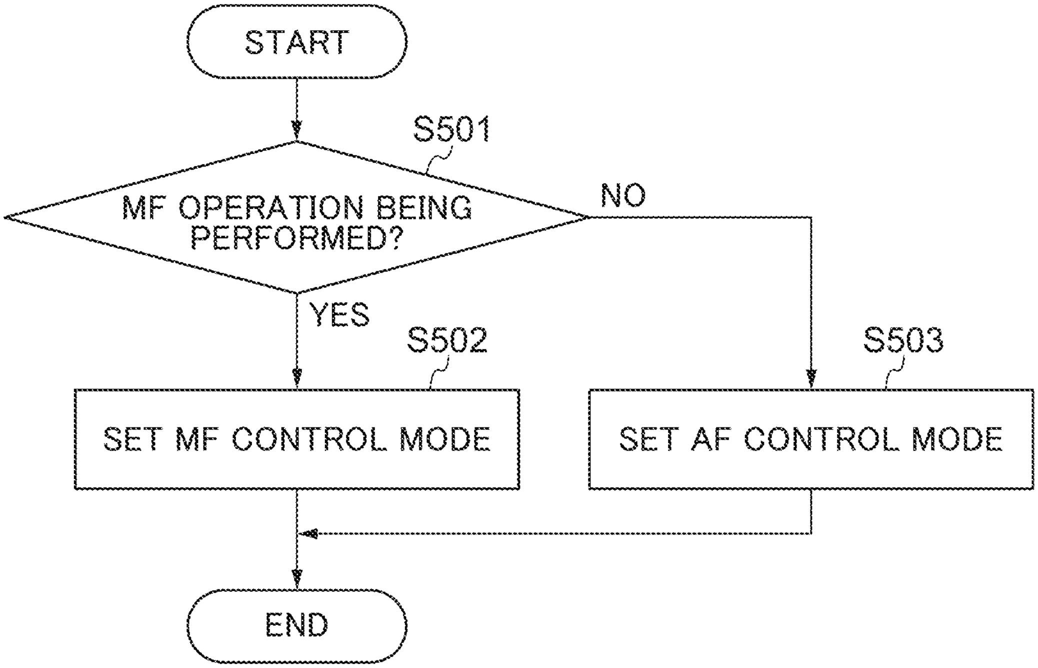
FIG. 5 is a flowchart of a focus mode selection process.

Next, the focus mode selection process performed in the step S301 in FIG. 3 will be described. FIG. 5 is a flowchart of the focus mode selection process. In a step S501, the focus controller 121 determines whether or not the focus ring is being operated by a user's operation. If the answer to the question of the step S501 is affirmative (YES) (if the focus ring is being operated), the process proceeds to a step S502. In the step S502, the focus controller 121 sets the focus mode to the MF control mode.

If the answer to the question of the step S501 is negative (NO) (if the focus ring is not being operated), the process proceeds to a step S503. In the step S503, the focus controller 121 sets the focus mode to the AF control mode. After execution of the step S502 or S503, the focus controller 121 terminates the focus mode selection process in FIG. 5. Here, the focus mode is sometimes changed by a switch for switching between AF and MF before operating the focus lens 105. In the present embodiment, the change between the AF control and the MF control is seamlessly performed, and hence the AF control mode is changed according to whether or not the focus lens 105 is operated. This control is also referred to as the fulltime manual focus.

Figure 6:
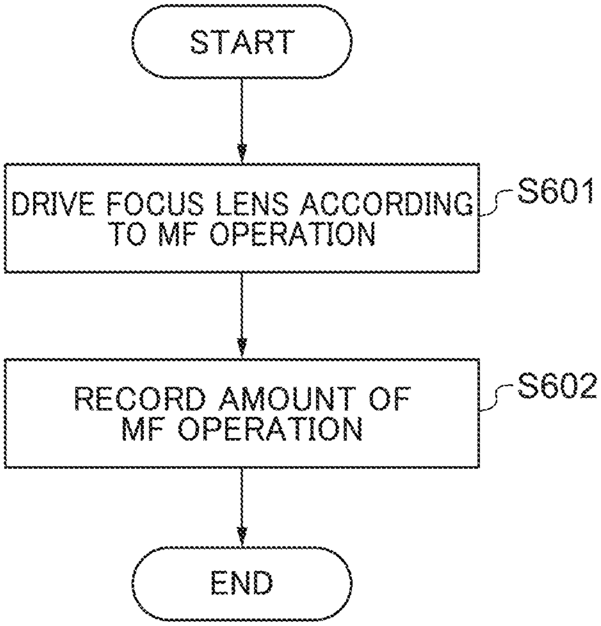
FIG. 6 is a flowchart of an MF process.

Next, the MF process performed in the step S311 in FIG. 3 will be described. The MF process is executed when the MF control mode is selected. FIG. 6 is a flowchart of the MF process. In a step S601, the focus controller 121 controls the focus lens-driving source 112 to drive the focus lens 105 in the optical axis direction in accordance with rotation of the focus ring based on a user's operation (MF operation). In a step S602, the focus controller 121 records a driving amount of the focus ring moved based on the user's operation as an MF operation amount by a user. The MF operation amount may be an operation time of the MF operation. The MF operation amount is continuously accumulated and recorded as long as the MF control mode continues, and accumulation of the MF operation amount is terminated when the MF control mode is changed to the AF control mode. Then, the recorded MF operation amount is reset when the AF control mode is changed to the MF control mode, and accumulation of the MF operation amount is started again.

Although the step S601 in FIG. 6 shows an example in which the focus lens 105 is driven in the optical axis direction based on the control of the focus controller 121, the focus lens 105 may be driven by another method. For example, in a case where the focus ring and the focus lens 105 are mechanically connected via a gear and the like, the focus lens 105 can be driven by operating the focus ring. In this case, the control by the focus controller 121 is not required.

Further, the driving of the focus lens 105 in the MF control mode may be performed based on an operation other than the operation of the focus ring. For example, the focus lens 105 may be driven by an operation member, such as a remote controller connected to the image capturing apparatus 100. Further, information other than the MF operation amount may be recorded in the step S602. For example, there may recorded a driving amount of the focus lens 105 driven in accordance with a user's operation, an amount of change in defocus amount, caused by driving the focus lens 105, a value obtained by converting the driving amount of the focus lens 105 to an amount of change in the corresponding defocus amount, or the like.

Next, a process for setting the ranging target AF area and the AF control mode, performed in the step S304 in FIG. 3, will be described. FIGS. 7A to 7H are diagrams showing a positional relationship between objects and the focus lens 105 and an example of a variety of screens. FIG. 8 is a flowchart of the process for setting the ranging target AF area and the AF control mode immediately after the focus mode is switched from the MF control mode to the AF control mode. In the process in FIG. 8, the focus controller 121 sets the ranging target AF area and the AF control mode according to the MF operation and the ranging results, for each of the following three cases.

The first case is a case where the main object is changed from an object brought into focus by AF to a different object in the center or its vicinity of the screen by a user's operation. For example, there is assumed a case where the AF control is performed on an object different from the object having been in focus through AF, by setting the same as a main object e.g. due to perspective conflict. In the first case, the ranging target AF area is set to the first ranging target AF area (standard), and the AF control mode is set to the second AF control mode (limit).

The second case is a case where the main object is changed to a different object which is not in the center or its vicinity of the screen by a user's operation. For example, there is assumed a case where when a main object exists outside the ranging target AF area in the center and its vicinity of the screen, the AF control is performed on the main object existing outside the ranging target AF area. In the second case, the ranging target AF area is set to the second ranging target AF area (wide), and the AF control mode is set to the second AF control mode (limit).

The third case is a case where an erroneous MF operation is performed by a user or a case where although an MF operation is performed, the main object is not changed. For example, as the third case, there is assumed a case where a focusing operation is performed from a state in which a blur has occurred. In the third case, the ranging target AF area is set to the first ranging target AF area (standard), and the AF control mode is set to the first AF control mode (normal). This setting is the first setting.

Figure 7A:
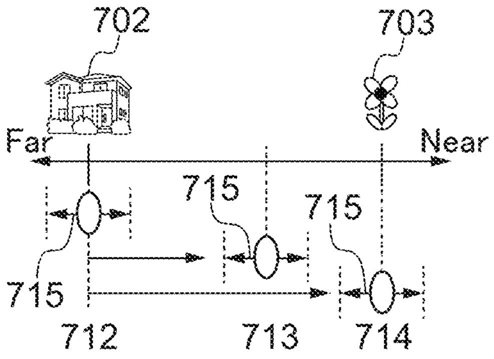
FIGS. 7A to 7H are diagrams showing a positional relationship between objects and a focus lens and examples of a variety of screens.
Figure 8:
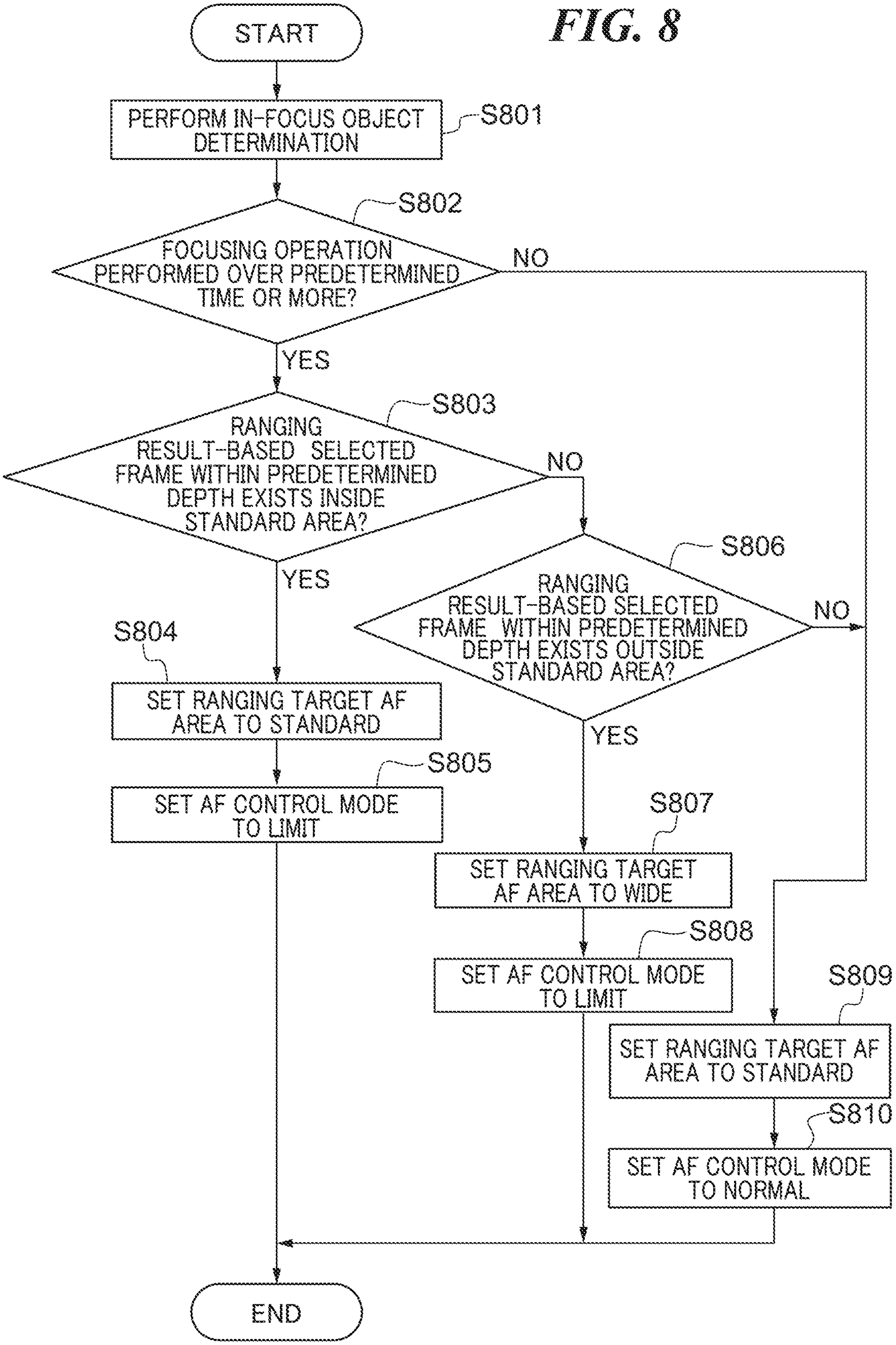
FIG. 8 is a flowchart of an example of a process for setting a ranging target AF area and an AF control mode immediately after the focus mode is switched from an MF control mode to the AF control mode.

FIG. 7A is a diagram showing an example of a positional relationship between objects and the focus lens 105. An example illustrated in FIG. 7A shows an infinity object 702 and a close object 703. Further, FIG. 7A shows a position 712 of the focus lens 105 for focusing on the infinity object 702, a position 714 of the focus lens 105 for focusing on the close object 703, and a position 713 of the focus lens 105 for focusing on an object in an intermediate position between the position 712 for focusing on the infinity object 702 and the position 714 for focusing on the close object 703. A range 715 indicates a predetermined range (in-focus range) for determining an in-focus object.

Figure 7B:
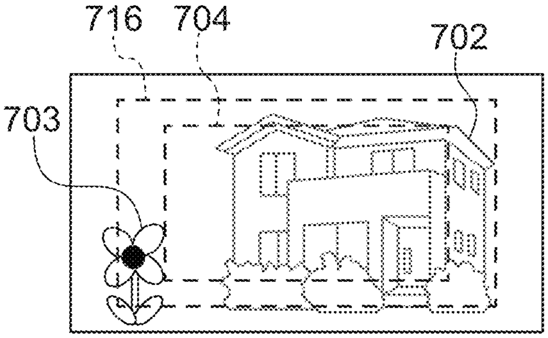
Figure 7C:
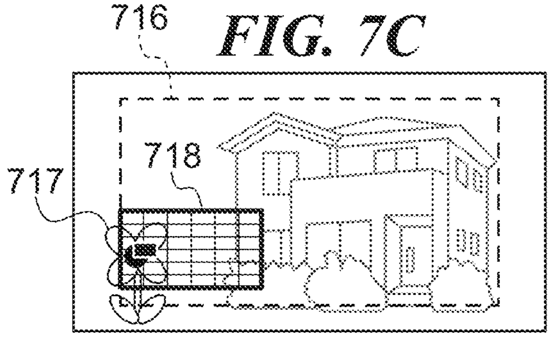

FIG. 7B is a diagram showing an example of two ranging target AF areas. A first ranging target AF area (standard) 704 is a ranging target AF area set when the focus lens 105 is in the position 714. The close object 703 is outside the first ranging target AF area (standard) 704, and hence in the normal AF control, it is impossible to focus on the close object 703. When the user intends to focus on the close object 703 and performs the MF operation by rotating the focus ring of the image capturing apparatus 100, the focus lens 105 is driven to move to the position 714 in FIG. 7A. With this, it is possible to focus on the close object 703.

When the user's MF operation is stopped in this state, the close object 703 is within the predetermined range 715 for determining an in-focus object. Therefore, the focus controller 121 can determine that the main object has been changed to the close object 703 by the user's operation. At this time, the focus controller 121 changes the ranging target AF area from the first ranging target AF area (standard) to the second ranging target AF area (wide) 716 appearing in FIG. 7C. With this, the close object 703 is in the second ranging target AF area (wide) 716, and hence it is possible to focus on the close object 703.

Then, the focus controller 121 disposes a track frame 718 for an in-focus position 717 of the close object 703, in the state in which the ranging target AF area is set to the second ranging target AF area (wide) 716. The track frame 718 will be described hereinafter. Further, the focus controller 121 changes the AF control mode from the first AF control mode (normal) to the second AF control mode (limit). With this, even when another object appears in the center of the screen, change of the main object from the close object 703 is prevented, and hence it is possible to maintain the in-focus state of the close object 703 in the in-focus position 717.

Figure 7D:
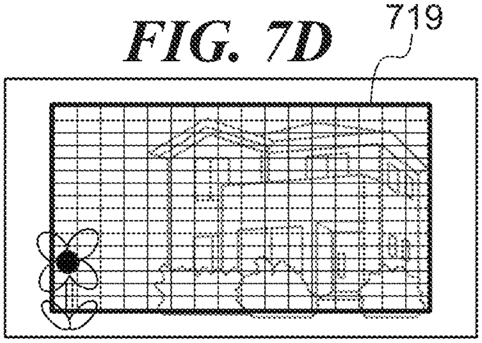

FIG. 7D is a diagram showing an example of a maximum ranging target AF area 719. The maximum ranging target AF area 719 corresponds to the ranging area 201 shown in FIG. 2. Here, there is assumed a case where the focus lens 105 is in the position 713 in FIG. 7A. In this case, the close object 703 as the main object does not exist in the predetermined range 715 for determining an in-focus object. This case is presumed to be the above-mentioned third case. Therefore, the ranging target AF area is set to the first ranging target AF area (standard), and the AF control mode is set to the first AF control mode (normal).

FIG. 8 is a flowchart of the setting process performed in the step S304 in FIG. 3. In a step S801, the focus controller 121 determines an in-focus object and selects a frame based on ranging results. The focus controller 121 selects a frame having the smallest ranging result (frame closest to the in-focus state) from the maximum ranging target AF area 719 shown in FIG. 7D. In a case where there are a plurality of frames each having a ranging result smaller than a predetermined value (frames close to the in-focus state), the focus controller 121 may select a frame in the center and its vicinity of the screen, or select the centroid of a plurality of frames having the same ranging result by referring to adjacent frames. Note that the selected frame is hereinafter referred to as the ranging result-based selected frame. The ranging result-based selected frame is selected in a case where there is an object.

In a step S802, the focus controller 121 determines whether or not a manual focus operation time (MF operation time) is not shorter than a predetermined time period in the MF control mode. The determination in the step S802 is processing for determining whether or not an MF operation based on a user's intention has been performed. For example, in a case where the MF operation time is shorter than the predetermined time period (the operation time is short), this operation can be an erroneous operation. In this case, the focus controller 121 inhibits change of the ranging target AF area and the AF control mode. The predetermined time period can be set to a desired time period, such as "0.4 seconds". If it is determined in the step S802 that the operation amount of manual focus (MF operation amount) is smaller than a predetermined operation amount in the MF control mode, the focus controller 121 may inhibit change of the ranging target AF area and the AF control mode. Since the MF operation amount has been recorded in the step S602 in FIG. 6, the focus controller 121 can determine whether or not to inhibit change of the ranging target AF area and the AF control mode based on the recorded MF operation amount.

If the answer to the question of the step S802 is affirmative (YES) (if the focusing operation time is not shorter than the predetermined time period), the process proceeds to a step S803. In the step S803, the focus controller 121 determines whether or not a ranging result-based selected frame within a predetermined depth is included inside the first ranging target AF area (standard). In a case where a ranging result-based selected frame within the predetermined depth is included, an object is detected. On the other hand, in a case where a ranging result-based selected frame within the predetermined depth is not included, no object is detected. If the answer to the question of the step S803 is affirmative (YES) (if a ranging result-based selected frame within the predetermined depth is included inside the first ranging target AF area (standard)), the process proceeds to a step S804.

In the step S804, the focus controller 121 sets the ranging target AF area to the first ranging target AF area (standard). The step S804 is processing for setting the ranging target AF area to the first ranging target AF area (standard) because the position of the ranging result-based selected frame (position of the object) determined in the step S801 is in the center or its vicinity of an image. In a step S805, the focus controller 121 sets the AF control mode to the second AF control mode (limit). The step S805 is processing executed in a case where it is determined based on the object in the ranging result-based selected frame determined in the step S801 that focusing is performed by the MF operation on an object different from the object detected in the AF control mode before the focus control is changed to the MF control mode. In this case, the focus controller 121 can maintain the focus on the object aimed by the user, by setting the AF control mode to the second AF control mode (limit). In this case, automatic tracking is performed for the object aimed by the user.

If the answer to the question of the step S803 is negative NO) (if a ranging result-based selected frame within the predetermined depth is not included inside the first ranging target AF area (standard)), the process proceeds to a step S806. In the step S806, the focus controller 121 determines whether or not a ranging result-based selected frame within the predetermined depth is outside the first ranging target AF area (standard). At this time, the focus controller 121 determines whether or not the ranging result-based selected frame determined in the step S801 is outside the first ranging target AF area (standard) and within the range of the second ranging target AF area (wide). If the answer to the question of the step S806 is affirmative (YES) (if the ranging result-based selected frame within the predetermined depth is outside the first ranging target AF area (standard)), the process proceeds to a step S807.

The predetermined depth mentioned in the steps S803 and S806 can be set to a desired value (such as three times as large as a proper depth). In a case where the predetermined depth is set to a large value, this increases a possibility that after the MF operation is performed by the user, AF is started with respect to an object other than the object aimed by the user. Inversely, in a case where the predetermined depth is set to a small value, it is necessary to move the lens to the vicinity of the in-focus point with respect to the object aimed by the user. As a result, a high level of skill is required to perform the user's operation, and further, the monitor is required to have good visibility. For this reason, it is preferable that the predetermined depth is within a predetermined range from the proper depth.

In the step S807, the focus controller 121 sets the ranging target AF area to the second ranging target AF area (wide). In this case, since it is determined that the object corresponding to the position of the ranging result-based selected frame determined in the step S801 is in a position not in the vicinity of the center, the focus controller 121 executes the step S807. In a step S808, the focus controller 121 sets the AF control mode to the second AF control mode (limit). In a case where the answer to the question of the step S806 is affirmative (YES), the focus controller 121 determines that focusing has been performed not on the object in the ranging result-based selected frame determined in the step S801, but on an object based on the MF operation. Therefore, the focus controller 121 executes the step S807. With this, it is possible to easily capture the object aimed by the user.

If the answer to the question of the step S802 is negative (NO), the process proceeds to a step S809. Further, if the answer to the question of the step S806 is negative (NO), the process proceeds to the step S809. In the step S809, the focus controller 121 sets the ranging target AF area to the first ranging target AF area (standard). The step S809 is executed in a case where the focusing operation time is shorter than the predetermined time period or in a case where no object is detected. For example, in a case where no ranging result-based selected frame is determined in the step S801, no object is detected. Further, in a case where it is determined that a ranging result-based selected frame determined in the step S801 is not within the predetermined depth (in a case where the answers to the questions of the step S803 and the step S806 are both negative (NO)), no object is detected. In a step S810, the focus controller 121 sets the AF control mode to the first AF control mode (normal). When the steps S809 and S810 are executed, the AF setting is changed to the first setting. After execution of the step S805, S808, or S810, the setting process in FIG. 8 is terminated.

Figure 9:
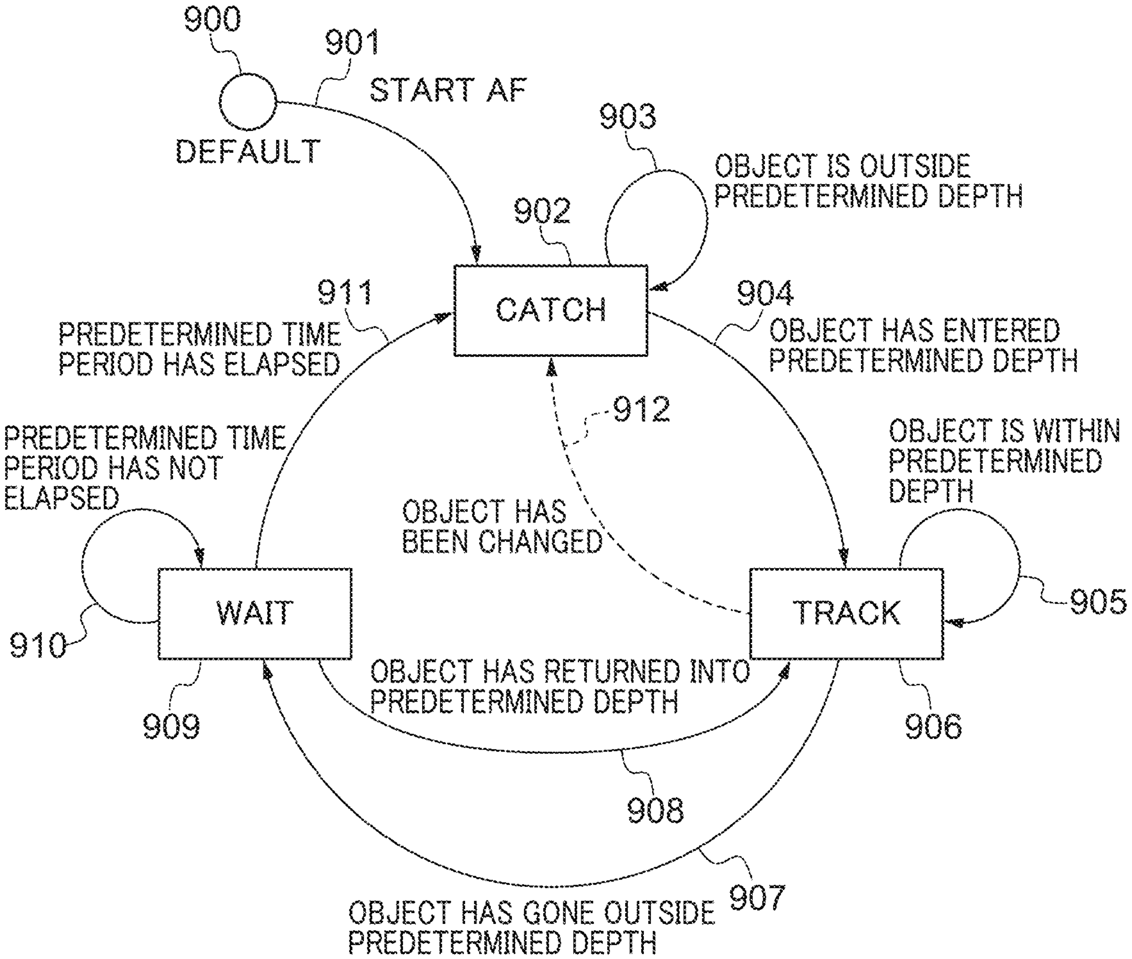
FIG. 9 is a diagram showing an example of shifts of AF states in an AF process.

Next, the AF process performed according to the AF control mode set in the step S304 or S310 will be described. FIG. 9 is a diagram showing an example of shifts of AF states in the AF process. In the present embodiment, the AF process has the following three AF states:

catch (state focusing on an object, from a state in which a blur has occurred)
track (state of maintaining a state focused on an object)
wait (state no longer capable of maintaining a state focused on an object)

When an instruction 901 for starting AF is provided from Default 900 indicative of an initial value, the AF state is shifted to Catch 902. In a case where an object is outside the predetermined depth (903), the AF state of Catch 902 is maintained. In a case where the object enters the predetermined depth (904), the AF state is shifted from Catch 902 to Track 906. If the object is within the predetermined depth (905), the AF state of Track 906 is maintained. In a case where an object goes outside the predetermined depth (907) from the AF state of Track 906, the AF state is shifted to Wait 909. Further, in a case where the object is changed in the AF state of Track 906 (912), the AF state is shifted to Catch 902.

In a case where a predetermined time period has not elapsed (910), the AF state of Wait 909 is maintained. In a case where the predetermined time period has elapsed (911), the AF state is shifted to Catch 902. Further, in a case where the object returns into the predetermined depth (908), the AF state is shifted to Track 906.

As described above, the focus controller 121 performs the AF process while shifting the AF state between the three AF states of Catch, Track, and Wait. Here, in a case where the AF control mode is set to the first AF control mode (normal), the focus controller 121 shifts the AF state from Track 906 to Catch 902. On the other hand, in a case where the AF control mode is set to the second AF control mode (limit), the focus controller 121 inhibits the AF state from being shifted from Track 906 to Catch 902. That is, in this case, change of a object as the focusing target is inhibited. With this, focusing on the object aimed by the user is maintained.

Figure 10:
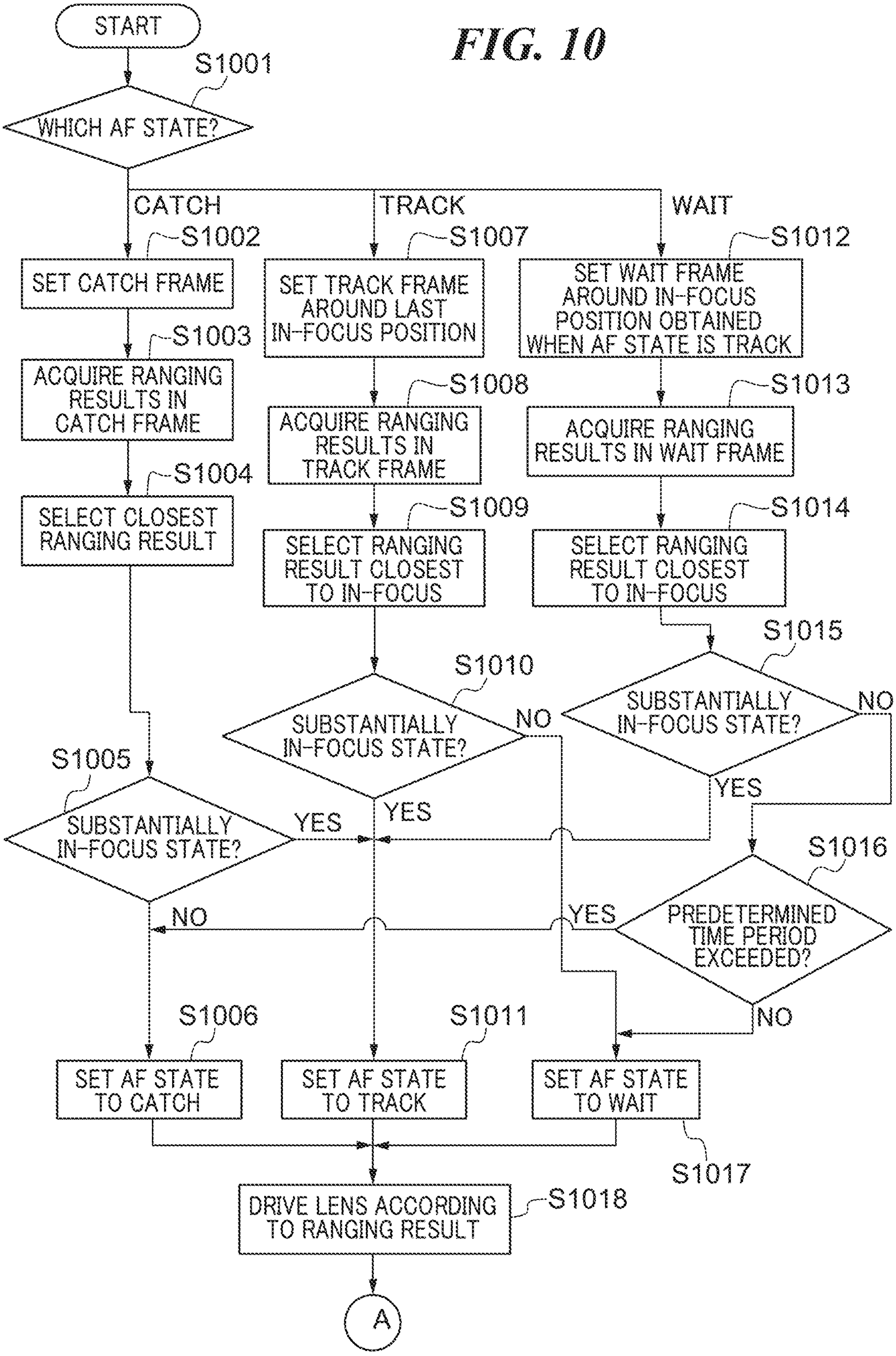
FIG. 10 is a flowchart of the AF process performed according to the AF control mode.
Figure 11:
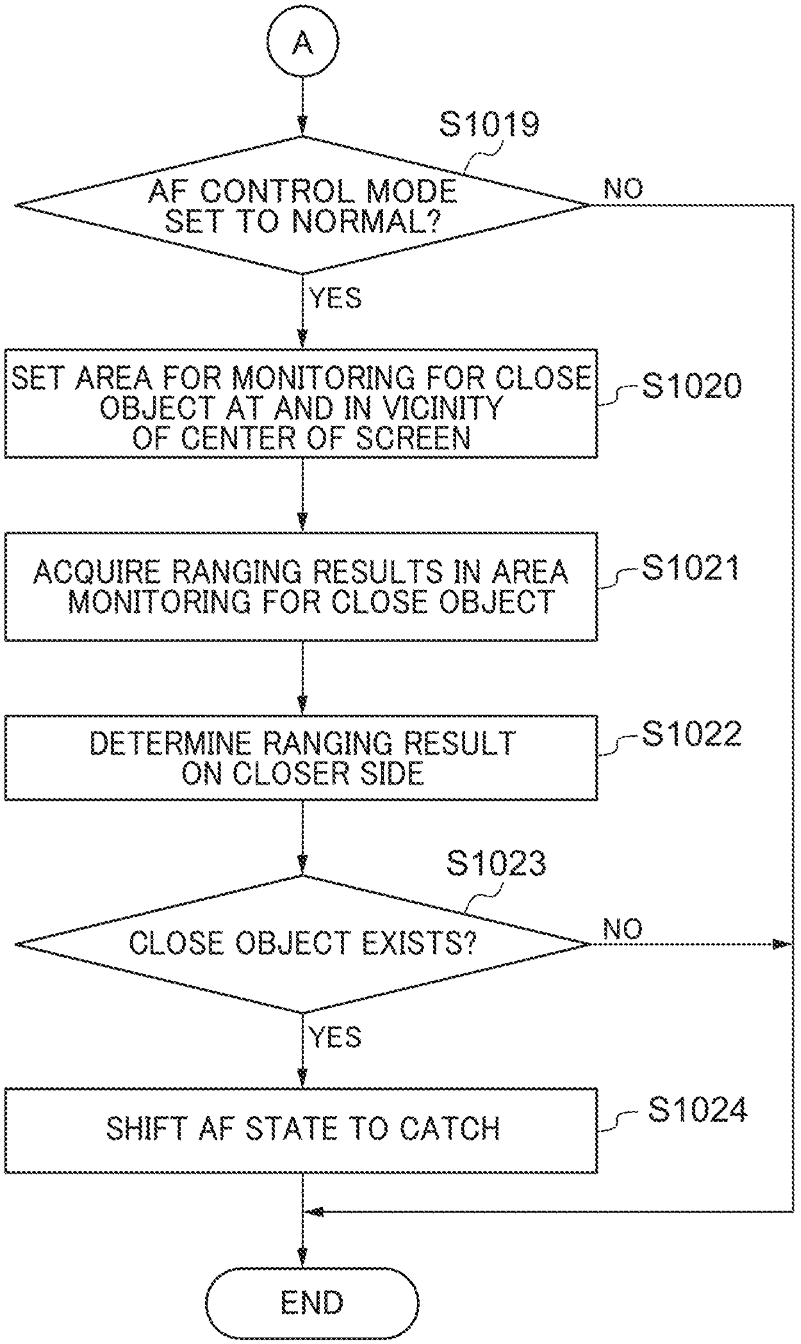
FIG. 11 is a continuation of FIG. 10.

FIGS. 10 and 11 are a flowchart of the AF process performed according to the AF control mode. In a step S1001, the focus controller 121 determines which of the AF states indicated in FIG. 9 the current AF state is. If it is determined that the AF state is Catch, the process proceeds to a step S1002. If it is determined that the AF state is Track, the process proceeds to a step S1007. If it is determined that the AF state is Wait, the process proceeds to a step S1012.

Figure 7E:
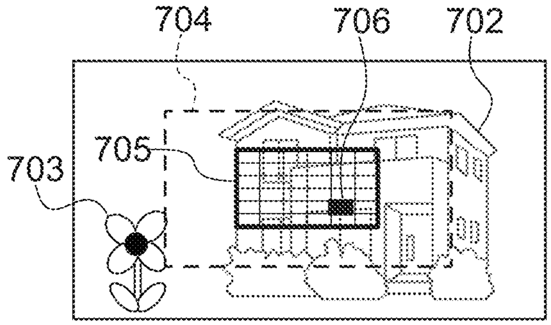
Figure 7F:
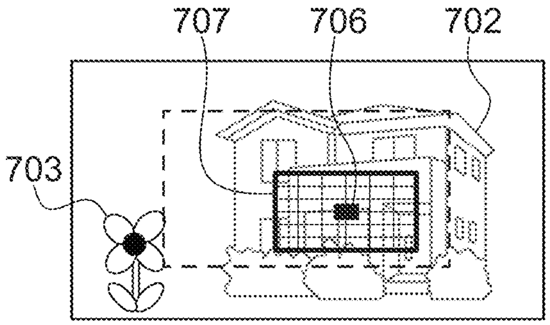

In the step S1002, the focus controller 121 sets a catch frame. FIG. 7E is a diagram showing an example of the screen on which a catch frame 705 is set in the vicinity of the center of the screen. As shown in FIG. 7E, the screen includes the infinity object 702 and the close object 703. Further, the first ranging target AF area (standard) 704 is indicated by broken lines. The catch frame 705 includes a plurality of ranging areas. In a step S1003, the focus controller 121 acquires respective ranging results of the plurality of ranging areas from the catch frame 705. In a step S1004, the focus controller 121 selects the closest ranging result from the plurality of ranging results acquired in the step S1003. In the illustrated example in FIG. 7E, an in-focus area 706 is selected as the closest ranging area.

In a step S1005, the focus controller 121 determines whether or not the ranging result obtained from the closest ranging area selected in the step S1004 indicates a substantially in-focus state. Even when the ranging result obtained from the closest ranging area selected in the step S1004 does not indicate a completely in-focus state, if the ranging result indicates a state in-focus within a certain range, the focus controller 121 determines that the answer to the question of the step S1005 is affirmative (YES) even when there is some deviation. If the answer to the question of the step S1005 is negative (NO), the process proceeds to a step S1006. In the step S1006, the focus controller 121 sets the AF state to Catch. After execution of the step S1006, the process proceeds to a step S1018. If the answer to the question of the step S1005 is affirmative (YES), the process proceeds to a step S1011.

In the case where it is determined in the step S1001 that the AF state is Track, in the step S1007, the focus controller 121 sets a track frame around the preceding in-focus area. In the illustrated example in FIG. 7F, the track frame, denoted by reference numeral 707, is set around the in-focus area 706 (in-focus area 706 in FIG. 7E). The track frame 707 includes a plurality of ranging areas. In a step S1008, the focus controller 121 acquires respective ranging results of the plurality of ranging areas from the track frame 707. In a step S1009, the focus controller 121 selects a ranging result closest to the in-focus state from the plurality of acquired ranging results.

In a step S1010, the focus controller 121 determines whether or not the ranging result selected in the step S1009 indicates a substantially in-focus state. If the answer to the question of the step S1010 is affirmative (YES), the process proceeds to the step S1011. In the step S1011, the focus controller 121 maintains the AF state in Track. After execution of the step S1011, the process proceeds to the step S1018. If the answer to the question of the step S1010 is negative (NO), the process proceeds to a step S1017.

In the case where the AF state is Track, the processing for setting the track frame around the in-focus position of the object, and further, selecting a ranging area closest to the in-focus state from the track frame (steps S1007 to S1011) is performed. By repeatedly executing the steps S1007 to S1011, even when the object moves in an X-Y direction, it is possible to cause the focus to follow the movement of the object.

Figure 7G:
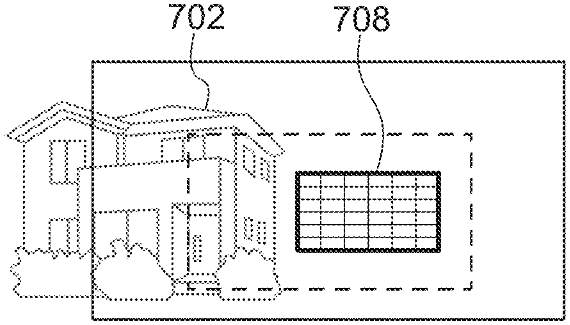

In the case where it is determined in the step S1001 that the AF state is Wait, in the step S1012, the focus controller 121 sets a Wait frame around the in-focus position obtained when the AF state is set to Track. FIG. 7G is a diagram showing an example of a case where the object is temporarily outside the track frame 707. For example, when the user performs an operation using the image capturing apparatus 100, if hand shake, unintended panning, or the like occurs, the object is sometimes temporarily goes out of the track frame. In this case, there is a possibility that the object returns into the track frame again. Therefore, the focus controller 121 sets a Wait frame 708 to the same position as the position of the last track frame 707 set when the AF state has been Track.

In a step S1013, the focus controller 121 acquires respective ranging results of the plurality of ranging areas from the Wait frame 708. In a step S1014, the focus controller 121 selects a ranging result closest to the in-focus state from the plurality of acquired ranging results. In a step S1015, the focus controller 121 determines whether or not the ranging result closest to the in-focus state, selected in the step S1004, indicates a substantially in-focus state. If the answer to the question of the step S1015 is affirmative (YES), the process proceeds to the step S1011. In the step S1011, the focus controller 121 shifts the AF state to Track. If the answer to the question of the step S1015 is negative (NO), the process proceeds to a step S1016.

In the step S1016, the focus controller 121 determines whether or not the time period in which the AF state is Wait is longer than a predetermined time period. If the answer to the question of the step S1016 is affirmative (YES), the process proceeds to the step S1006. In a case where the time period in which the AF state is Wait and the focus state is not substantially in-focus state has continued for the predetermined time period or more, there is assumed a situation in which the tracked object disappears from the screen or the object disappears from the screen e.g. due to panning. In such a case, the focus controller 121 changes the AF control such that a focusing operation is performed for a catch frame in the center and its vicinity of the screen. On the other hand, if the answer to the question of the step S1016 is negative (NO), the process proceeds to the step S1017. In this case, the focus controller 121 maintains the AF state in Wait.

In the step S1018, the focus controller 121 performs lens driving according to the ranging result. At this time, the focus controller 121 converts the ranging result selected in one of the S1004, S1009, and S1014 to a lens driving amount and provides a driving command to the focus lens-driving source 112 that drives the focus lens 105. After execution of the step S1018, the process proceeds to a step S1019 in FIG. 11.

In the step S1019, the focus controller 121 determines whether or not the AF control mode is the first AF control mode (normal). If the answer to the question of the step S1019 is affirmative (YES) (if the AF control mode is the first AF control mode (normal)), the process proceeds to a step S1020. In the step S1020, the focus controller 121 sets an area for monitoring for a close object in the center and its vicinity of the screen. In the illustrated example in FIG. 7H, the monitoring area, denoted by reference numeral 709, for a close object 710, is set in the vicinity of the center of the screen.

The monitoring area includes a plurality of ranging areas. In a step S1021, the focus controller 121 acquires respective ranging results from the plurality of ranging areas in the monitoring area for the close object. In a step S1022, the focus controller 121 determines a ranging result on the nearer side of the current lens position (associated with the position of the object currently in focus) out of the plurality of ranging results acquired in the step S1021.

In a step S1023, the focus controller 121 determines whether or not there is a close object. At this time, if it is determined in the step S1022 that there is a ranging result on the nearer side of the current lens position, the focus controller 121 determines that a close object has appeared. In this case, the focus controller 121 determines that the answer to the question of the step S1023 is affirmative (YES). If the answer to the question of the step S1023 is affirmative (YES), the process proceeds to a step S1024. In the step S1024, the focus controller 121 shifts the AF state to Catch. In a case where a close object has appeared, the AF state is shifted to Catch, whereby it is possible to shift the AF control to the AF processing for tracking the object again. Then, the focus controller 121 terminates the AF process performed according to the AF control mode.

Figure 7H:
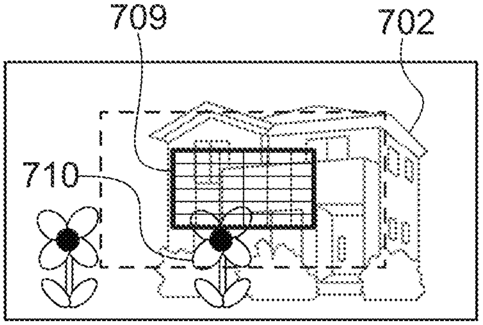

If the answer to the question of the step S1019 is negative (NO), or if the answer to the question of the step S1023 is negative (NO), the focus controller 121 terminates the AF process performed according to the AF control mode in FIGS. 10 and 11. By executing the steps S1019 to S1024, the close object 710 rather than the infinite object 702 is always monitored for, as shown in FIG. 7H. With this, in a case where the close object 710 appears on the screen, it is possible to focus on the close object 710.

As described above, in the present embodiment, when the focus control is switched from the AF control mode to the MF control mode by a user's operation, and then switched from the MF control mode to the AF control mode, the AF control mode is varied immediately after being switched from the MF control mode to the AF control mode. In a case where an object is detected in the MF control mode, the in-focus state on the detected object is maintained, whereas in a case where no object is detected in the MF control mode, the focus control mode is returned to the AF control mode set before being switched to the MF control mode. With this, the versatile AF is realized, and it is possible to realize highly dedicated AF with respect to an object aimed by a user in the MF control mode. As a result, it is possible to prevent an object aimed by a user from being excluded from the focusing target.

Further, in a case where an object exists outside the ranging target AF area set in the AF control mode before being switched to the MF control mode, the ranging target AF area is expanded in the AF control mode switched from the MF control mode. With this, it is possible to realize the AF with respect to the object aimed by the user. Further, it is possible to prevent focusing on an object which is not intended by the user. Further, in a case where an object aimed by the user is detected from the expanded ranging target AF area, the in-focus state with respect to the detected object is maintained. Therefore, even in a case where an object exists outside the ranging target AF area set in the AF control mode before being switched to the MF control mode, it is possible to realize the versatile AF and the exclusive AF.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-060781 filed Mar. 31, 2021, which is hereby incorporated by reference herein in its entirety.

What is claimed is:

1. A focus control device comprising:

a focus detection unit that outputs a focus detection result based on signals output from an image sensor;

a focus adjustment unit that performs focus adjustment by using one of autofocus for automatically controlling a focus lens position based on the focus detection result and manual focus for controlling the focus lens position in accordance with an input operation by a user; and a controller that, in a case where focus control is switched from the manual focus, in a state where an object is focused by the manual focus, to the autofocus, controls the focus adjustment, by the autofocus set after the switching from the manual focus, so as to continue focusing on the object focused by the manual focus, wherein a depth range in which the object is determined as being in focus when the object is focused by using the manual focus is wider than a depth range in which the object is determined as in focus when the object is focused by using the autofocus.

2. The focus control device according to claim 1, wherein in a case where the focus control is switched from the autofocus to the manual focus and then is switched from the manual focus to the autofocus, the controller controls the focus adjustment, by the autofocus set after the switching from the manual focus, so as to continue focusing on the object focused by the manual focus.

3. The focus control device according to claim 1, further comprising a display controller that controls a display to display information indicating a target of the autofocus.

4. The focus control device according to claim 1, further comprising a display controller that controls a display to display a frame for identifying an area as a target of the autofocus.

5. The focus control device according to claim 1, wherein in a case where the focus control is switched from the manual focus to the autofocus and an operation for changing a photographing scene is performed, the controller does not control the focus adjustment so as to continue focusing on the object focused by the manual focus.

6. The focus control device according to claim 1, wherein in a case where the focus control is switched from the manual focus to the autofocus, the controller does not control the focus adjustment so as to continue focusing on the object focused by the manual focus, when a predetermined amount or more of a zoom operation has been performed, panning has been detected, or there is a predetermined amount or more of change in the focus detection result.

7. The focus control device according to claim 1, wherein in a case where the focus control is switched from the manual focus to the autofocus and operation time for the manual focus is shorter than a predetermined time period, the controller does not control the focus adjustment so as to continue focusing on the object focused by the manual focus.

8. The focus control device according to claim 1, wherein in a case where the focus control is switched from the manual focus to the autofocus and an operation amount of the manual focus is smaller than a predetermined operation amount, the controller does not control the focus adjustment so as to continue focusing on the object focused by the manual focus.

9. The focus control device according to claim 1, wherein the input operation is operating a focus ring.

10. The focus control device according to claim 1, wherein in a case where the focus control is switched from the manual focus to the autofocus, the controller controls the focus adjustment, by the autofocus set after the switching from the manual focus, so as to set a track frame for the object focused by the manual focus.

11. The focus control device according to claim 1, wherein in a case where a predetermined time period has elapsed from the controller fails to continue the focusing on the object, the controller focuses on an area in a center of a screen.

12. An image capturing apparatus comprising:

an image sensor configured to output signals; and a focus control device comprising:

a focus detection unit that outputs a focus detection result based on signals output from the image sensor;

a focus adjustment unit that performs focus adjustment by using one of autofocus for automatically controlling a focus lens position based on the focus detection result and manual focus for controlling the focus lens position in accordance with an input operation by a user; and a controller that, in a case where focus control is switched from the manual focus, in a state where an object is focused by the manual focus, to the autofocus, controls the focus adjustment, by the autofocus set after the switching from the manual focus, so as to continue focusing on the object focused by the manual focus, wherein a depth range in which the object is determined as being in focus when the object is focused by using the manual focus is wider than a depth range in which the object is determined as in focus when the object is focused by using the autofocus.

13. A focus controlling method comprising:

outputting a focus detection result based on signals output from an image sensor; and performing focus adjustment by using one of autofocus for automatically controlling a focus lens position based on the focus detection result and manual focus for controlling the focus lens position in accordance with an input operation by a user;

wherein performing the focus adjustment includes, in a case where focus control is switched from the manual focus, in a state where an object is focused by the manual focus, to the autofocus, controlling the focus adjustment, by the autofocus set after the switching from the manual focus, so as to continue focusing on the object focused by the manual focus, and wherein a depth range in which the object is determined as being in focus when the object is focused by using the manual focus is wider than a depth range in which the object is determined as in focus when the object is focused by using the autofocus.

14. A non-transitory computer-readable storage medium storing a program for causing a computer to execute a focus controlling method, wherein the method comprises:

outputting a focus detection result based on signals output from an image sensor; and performing focus adjustment by using one of autofocus for automatically controlling a focus lens position based on the focus detection result and manual focus for controlling the focus lens position in accordance with an input operation by a user;

wherein performing the focus adjustment includes, in a case where focus control is switched from the manual focus, in a state where an object is focused by the manual focus, to the autofocus, controlling the focus adjustment, by the autofocus set after the switching from the manual focus, so as to continue focusing on the object focused by the manual focus, and wherein a depth range in which the object is determined as being in focus when the object is focused by using the manual focus is wider than a depth range in which the object is determined as in focus when the object is focused by using the autofocus.

* * * * *